United States Patent Office 3,592,817
Patented July 13, 1971

3,592,817
PREPARATION OF PERCHLOROPYRIDINE AND PERCHLOROCYANOPYRIDINE COMPOUNDS BY VAPOR PHASE CHLORINATION OF ALIPHATIC NITRILES
Howard Johnston, Michael J. Marinak, and Sven H. Ruetman, Walnut Creek, Calif., assignors to The Dow Chemical Company, Midland, Mich.
No Drawing. Filed May 17, 1968, Ser. No. 729,924
Int. Cl. C07d *31/26*
U.S. Cl. 260—290
9 Claims

ABSTRACT OF THE DISCLOSURE

A novel process is disclosed whereby highly chlorinated pyridines and cyanopyridines can be prepared by the vapor phase chlorination of lower aliphatic nitriles containing from 3 to about 10 carbon atoms. For example, pentachloropyridine can be produced in excellent yields by the chlorination of valeronitrile, while isomeric tetrachlorocyanopyridines can be prepared by the chlorination of such compounds as adiponitrile or a 1,4-dicyanobutene. The process is one whereby mixed vapors of the aliphatic nitrile and chlorine are reacted together in the presence of a diluent gas at temperatures of from at least 450° to 750° C.

BACKGROUND OF THE INVENTION

The highly chlorinated pyridine and cyanopyridine compounds produced by the method of the invention are highly useful compounds, and much effort has been made to provide efficient synthesis routes for their preparation. For example, methods exist for the chlorination of aromatic heterocyclic nitrogen compounds such as pyridine, picolines, collidines, ethylpyridines and quinolines in either the liquid or the vapor phase. However, the reported processes have yielded such a spectrum of products as to render the method impractical for commercial operation. Moreover, the known methods are usually accompanied by extensive formation of tars and of undesirable degradation products, thereby further reducing the efficiency of the operation.

It is an object of this invention to provide a method for the efficient preparation of highly chlorinated pyridines and cyanopyridines which can be operated without the disadvantages of the known methods. Still another object is to provide a method whereby said compounds can be prepared from readily available and inexpensive, non-aromatic compounds.

SUMMARY OF THE INVENTION

According to the present invention, it has been discovered that aliphatic nitriles can be converted to perchloropyridine and/or perchlorocyanopyridine compounds in a method whereby mixed vapors of the nitrile reactant and chlorine present in excess are reacted together in the presence of a diluent gas at temperatures in a range of from at least 450° C. to 750° C. The ensuing reaction, which involves simultaneous cyclization, chlorination and dehydrochlorination of the nitrile reactant, proceeds in a rapid manner and is capable of providing good yields of the desired compounds when preferred reactants are employed. When conducted under optimum conditions the reaction product is substantially free of tars and undesired decomposition products.

As employed in the present specification and claims, the expression "aliphatic nitrile" means (1) an aliphatic hydrocarbon mononitrile containing from 3 to 7 carbon atoms, inclusive, (2) an aliphatic hydrocarbon dinitrile containing from 6 to 10 carbon atoms, inclusive, with 5 or 6 of said carbon atoms being in a straight chain and (3) chloro derivatives of any of the foregoing with not more than one chlorine atom on any one carbon atom. Representative aliphatic nitrile reactants are acrylonitrile, methacrylonitrile propionitrile, butyronitrile, n-valeronitrile, hexanonitrile, heptanonitrile, isobutyronitrile, 4-pentenonitrile, 4-pentynonitrile, 2-butenonitrile, 2-chloroacrylonitrile, 3-chloroacrylonitrile, 2-chloropropionitrile, 3-chloropropionitrile, 2,3-dichloropropionitrile, 4-chlorobutyronitrile, 5-chloropentanonitrile, adiponitrile, 1,4-dicyano-2-butene, 1,4-dicyano-1-butene, 3-ethyl-3-methyl-1,5-pentanedinitrile, 2,4-hexadiene-1,6-dinitrile, 3-methyl-1,6-hexanedinitrile, 2,3-dichlorobutyronitrile, 2,3-dichloropropenonitrile and 2,2′-diethyladiponitrile.

In general, perchloropyridines, which in some cases may include a chloroaliphatic side chain, are prepared by the method of this invention from aliphatic nitrile compounds containing a single cyano group and a total of from 5 to 7 carbon atoms. Isomeric tetrachlorocyanopyridines are the predominant cyclized products which can be prepared from (1) aliphatic nitriles having a single cyano group and containing a total of 3 or 4 carbon atoms, or (2) from aliphatic nitriles having two cyano groups and containing a total of from 6 to 10 carbon atoms, inclusive, of which 5 or 6 are present in a straight chain. These perchlorinated reaction products have utility as pesticides against a wide variety of insect and plant pests and as intermediates for the preparation of many useful substituted pyridines and pyridyl-substituted compounds. For example pentachloropyridine can be used as a herbicide for the control of undesirable plant pests, and the various isomeric tetrachlorocyanopyridines give excellent control of lower plant species such as soil-dwelling fungi.

To provide the diluent gas which is present during the reaction there may be employed materials which are either vaporous or readily vaporized and which are substantially inert under the reaction conditions employed. Included are nitrogen, carbon dioxide, hydrogen chloride and sulfur dioxide, as well as perchlorinated hydrocarbons. Also included are other highly chlorinated hydrocarbons such as chloroform which can be employed as diluent provided sufficient additional chlorine is supplied to accommodate the conversion thereof to a perchlorohydrocarbon in the reaction zone. The preferred diluents are volatile perchlorinated hydrocarbons such as tetrachloroethylene, hexachlorobutadiene and carbon tetrachloride, as well as mixtures of one or more of said compounds with chloroform. It is also possible to practice the invention by employing as the sole "diluent" gas a large excess of the chlorine reactant over and above the stoichiometric chlorine requirement.

In practicing the present invention, an excess of chlorine is employed. The term "excess chlorine," as employed herein, designates chlorine employed in an amount over and above that which is stoichiometrically required to effect aromatization and percholorination of the aliphatic nitrile starting material to form the perchlorinated pyridine and cyanopyridine products, together with hydrogen chloride and other by-products. The stoichiometric chlorine requirement also includes that which may be consumed by conversion of the diluent to a perchlorinated hydrocarbon, as referred to above. The minimum stoichiometric requirements for chlorine are generally of the order of ½ mole for each hydrogen atom in a molecule of the aliphatic nitrile starting compound and ½ mole for each chlorine atom in a molecule of the perchlorinated product. Those aliphatic nitrile starting materials which already incorporate chloro groups require proportionally less chlorine. In carrying out the invention there preferably is employed at least a 20 percent excess of chlorine, and in a more preferred practice of the invention there is employed at least a 100 percent excess of chlorine. A 3- to 15-fold or even larger excess of chlorine over the stoichiometrically required amount can also be employed with good results, and when present in such amounts the excess chlorine serves a substantial diluent function as well as a reactant function and thus makes it possible to reduce the content of inert vaporous diluent or to omit the same altogether, if desired. However, even when employing a 3-fold or larger excess of chlorine, one or more inert diluents such as vaporous carbon tetrachloride or the like are preferably employed so as to facilitate evaporation and to effect better control over the reaction and reduce any tendency toward the formation of undesirable by-products.

The amount of inert diluent to be employed is not critical and good results can be obtained by using from about 3 to at least 50 moles of this diluent per mole of the aliphatic nitrile starting compound, and such a range is preferred whether or not there is also employed a large excess of chlorine.

In carrying out the process of this invention, the mixed vapors of the aliphatic nitrile reactant, or of a mixture of said compounds, together with chlorine present in excess and any inert diluent gas employed, are introduced into a reaction zone maintained at temperatures falling within a range of from at least 450° C. to 750° C. It is critical and essential to the practice of this invention that the process be carried out in the presence of diluent gas within the stated temperature range, and that the vapors admitted to the reaction zone be well mixed and preferably in a condition of turbulent flow.

It is among the advantages of the present process that when the mixed vaporous reactants are brought to the recited reaction temperatures, an overall exothermic, homogeneous reaction rapidly ensues. However, due to the presence of the diluent gases it may be necessary to supply the reaction zone with external heat in order to maintain the temperature at the desired level. It is a further advantage that the reaction produces good yields of the desired products with little formation of tars and other undesirable by-products.

Preferred conditions for carrying out the reaction depend in a measure upon the particular materials under treatment. Thus, desirable ratios of chlorine and diluent gases to the aliphatic nitrile starting compound, residence times and reaction temperatures vary somewhat depending on the nature of the reactant and on the degree of chlorination of the starting materials. As noted, chlorine itself may be a neutral substituent on the cyano-substituted aliphatic reactant compound, and such partially chlorinated compounds may be further chlorinated and converted to cyclized aromatic products by a practice of the present method. This embodiment of the invention is of particular importance from the standpoint of enabling recycle of incompletely chlorinated products recovered from the reaction product when the process is operated in a continuous fashion.

The reaction step of the present invention takes place very rapidly and is capable of providing good yields of the desired perchlorinated pyridine and cyanopyridine products. Although the duration of the reaction, i.e., the residence time spent by the reaction mixture in the reaction zone, is not critical, the reactants should not be permitted to remain in contact with one another for a prolonged period once they have been brought to reaction temperatures above about 450° C. This reaction period, which generally will not exceed 5 to 6 minutes, depends somewhat on the particular temperature employed for the given reactants. Thus, lowering the temperature 10 degrees may substantially lengthen the permissible reaction time, though such changes will ultimately be limited by the operable range for obtaining a particular product. The preferred residence time is from about 5 to 30 seconds for temperatures in a range of 450° to 750° C. However, residence times of only 1 to 5 seconds may suffice at temperatures in a range of from about 650° to 750° C.

Within the broadly operable reaction temperature range of from at least 450° C. to 750° C., a preferred temperature range is from about 500° C. to 675° C. The optimum temperature to employ for a given preparation may vary somewhat depending on the nature of the aliphatic nitrile starting material, the presence or absence of a recycle stream, and the nature and/or magnitude of the excess of chlorine and of any other diluent gas employed. When operating with any particular feed composition and with given feed/chlorine/diluent ratios, one or a few range-finding preparations will suffice for a proper determination of the optimum temperature and residence time for obtaining desirable yields of particular products.

Operating pressures to be maintained during the reaction are not critical and may vary from subatmospheric to somewhat superatmospheric. Atmospheric pressures are satisfactory and preferred.

In carrying out the reaction for the preparation of the perchlorinated pyridine and/or cyanopyridines, the nitrile starting compound and inert diluent, if employed, are vaporized by passing said compounds through a suitable evaporator maintained at a temperature high enough to effect vaporization of the cyanoaliphatic feed and of any diluent employed and to bring the resultant vapors up to temperatures of from about 100° C. to 450° C. or higher. Preferably, a diluent is employed which, in liquid form, is miscible with the cyanoaliphatic feed compound or is capable of dissolving the same. The resulting liquid is that which is passed through the evaporator. If it proves to be impractical to use a diluent of this character, the desired good mixing of the feed and diluent vapors can also be obtained by separately vaporizing the respective feed and diluent components and then bringing the hot vapors together for mixing with the chlorine reactant. Any suitable vaporizing device can be employed as an evaporator, and an inclined tube jacketed with heating coils or a wiped film evaporator have been found to be convenient. For efficient operation it is necessary that the feed rate and/or temperature of the evaporator be maintained so as to completely vaporize the aliphatic nitrile reactant and maintain it in the vaporized state. Incomplete vaporization results in decreased yields of the desired perchlorinated products.

The hot vapors from the evaporator are mixed with excess chlorine, said mixing preferably taking place just prior to the point of entry of the feed stream to the reactor. The resulting gaseous mixture is introduced at a rapid rate into a reactor maintained at a temperature of from at least 450° to 750° C. Preferably the mixed gases entering the reactor are in a state of turbulent flow such as to provide a Reynolds number of at least 800 and, more preferably, of at least 2000. The ensuing reaction which takes place under these temperature conditions is formative of pentachloropyridine and/or tetrachlorocyanopyridine compounds, together with hydrogen chloride and various other compounds as by-products. In one preferred embodiment, the mixing of the reactants is accomplished in a nozzle from which the mixture is then immediately and rapidly injected in turbulent flow into the heated reactor. Generally, an inlet vapor velocity of the feed into the heated reaction zone of from about 40 to 150 feet per second is considered desirable. Alternatively, the diluent-containing vapors of the aliphatic nitrile compound and chlorine may be simultaneously but separately introduced into the reactor. In this method the chlorine is jetted in at a point close to the point of introduction of the cyanoaliphatic compound in such manner as to ensure rapid mixing and turbulent flow of the reactants as they are discharged into the reactor.

Any suitable reactor can be employed, and since the reaction is exothermic, strong heating may be required only at the initiation of the reaction. Thereafter heat is applied only as required to maintain the reaction mixture at the desired temperature. Accordingly, the reactor should be provided with a heating coil or other heating means so as to bring the entrant feed gases rapidly up to reaction temperatures and to maintain said temperatures as the gaseous mixture is swept through the reaction zone. The inlets, outlets and interior surfaces of the reactor must be of materials such as are known to resist corrosion by chlorine and hydrogen chloride at high temperatures. Thus, for example, such surfaces may be lined with nickel, carbon, silica or glass. In practice, it has been found that thermally resistant, high-silica glass such as Vycor brand is satisfactory for small reactors. In large scale apparatus it is convenient to employ a shell of nickel lined with fused silica or a suitable refractory such as carbon. In a preferred form of apparatus the reactor proper is in the form of a cylinder having a length of 4 to 6 times its diameter. Conventional accessories, such as flow-meters on the inputs and condensors, cooling tubes or a quench tower for the exit gases are employed.

To accomplish the rapid and preferably turbulent mixing and introduction of the reactants into the reaction zone, the reactor may be fitted with a mixing nozzle, as described above. Alternatively, the vaporous aliphatic nitrile reactant, diluent and the chlorine may be introduced into the reactor by separate orifices adjusted so that the chlorine is jetted into the incoming stream or streams of vaporous aliphatic reactant and diluent. In a further embodiment wherein the vaporous aliphatic nitrile reactant, diluent and chlorine are introduced into the reactor with mixing immediately prior to such introduction, the mixing and introduction are carried out in a tube or the like having a diameter which is small in relation to the diameter of the reactor whereby turbulence at the entrance is achieved at relatively low Reynolds numbers in accordance with known principles.

The vapors passing from the reactor are cooled or quenched to separate (a) a liquid mixture comprising perchlorinated or partially chlorinated pyridine and cyanopyridine products, inert diluent and any unreacted or partially reacted aliphatic nitrile compounds from (b) a gaseous mixture comprising chlorine, hydrogen chloride and any other gaseous by-products. Depending on the product sought from the reaction, the liquid mixture can be fractionally distilled under ambient or reduced pressures to recover the desired product or products either as distillate fractions or as a residue. Alternatively, the liquid may be cooled to precipitate the product which is then recovered by filtration. Materials not fully chlorinated can be recovered as such or recycled to the evaporator for further reaction. The separated gaseous mixture can be scrubbed according to conventional procedures to separate chlorine from the hydrogen chloride formed during the reaction. The former can be dried and recycled, while the latter can be recovered as hydrochloric acid or recycled in those cases where it performs a diluent function. The perchlorinated pyridine and cyanopyridine product compounds, whether recovered by distillation, by precipitation and filtration or by other known method, can be further purified by recrystallization from a solvent or by other methods well known to those skilled in the art.

The products produced by the method of this invention have known physical and chemical characteristics. They can thus be identified by appropriate analytical methods including infrared absorption, gas liquid chromatography, mass spectrography, elemental analysis, and nuclear magnetic resonance, among other methods.

In a preferred method for carrying out the process according to the present invention, an appropriate aliphatic nitrile reactant compound or mixture of said compounds, together with inert diluent, is introduced into a heated evaporator where the reactant and diluent are vaporized, the resulting hot effluent vapors from the evaporator are rapidly and thoroughly mixed with excess chlorine and introduced into a reactor maintained at temperatures of from at least 450° C. to 750° C., the reactants are maintained in said reactor for a short period of time, and the reaction product is then conducted from the reactor and condensed. Following this the desired products are recovered from the liquid condensate by conventional procedures known to those skilled in the art.

DESCRIPTION OF THE PREFERRED EMBODIMENTS

The following examples illustrate the invention but are not to be construed as limiting:

Example 1

In this operation a solution of 30 grams (0.361 mole) of n-valeronitrile in 270 grams of carbon tetrachloride was continuously metered under 5 p.s.i. nitrogen pressure from a feed reservoir through a heated evaporator tube at a rate of about 4.2 grams per minute. The temperature in the tube was such as to evaporate the feed stream and provide a vapor exit temperature of 210° C. Chlorine gas was continuously metered into the hot exit vapors from the evaporator in a mixing nozzle at a rate of 7 grams per minute, the mole ratio of chlorine to valeronitrile in the feed stream being about 20:1. The resulting gases were rapidly mixed and continuously jetted through the small orifice (0.25 cm. diameter) of the mixing nozzle at a rate of 102 feet per second into one end of a heated "Vycor" glass reactor having a 1.35 liter capacity and a length to diameter ratio of 5:1. The reactor temperature was maintained at 600° C. throughout the run, and the calculated residence time of the vapors in the reactor was about 9 seconds. The mixing nozzle was maintained at temperatures only slightly below those prevailing in the reactor. Under these conditions the gases passing through the nozzle and into the reactor were well mixed and in a highly turbulent condition. The reaction mixture on leaving the reactor was condensed in two consecutive cold traps cooled with a Dry Ice-dichloromethylene mixture. The run was terminated after 59 minutes when 248 grams of the feed solution had been passed through the unit. The crude product mixture so recovered was slowly warmed to room temperature and the excess chlorine and hydrogen chloride were caught in a trap containing a 10 percent aqueous solution of sodium hydroxide. The residual product was filtered and evaporated to dryness under reduced pressures, giving 72 grams of a light brown solid residue. Gas liquid chromatographic (g.l.c.) analysis of the product through a column calibrated against authentic tetrachlorocyanopyridine isomers and pentachloropyridine showed the major component to be 95.6 mole percent of the product. Infrared spectrum and g.l.c. retention time identified this component as pentachloropyridine.

Example 2

Using the equipment and the same general procedure as described in Example 1, a feed solution containing 100 g. (0.925 mole) of adiponitrile in 220 g. of chloroform and 680 g. of carbon tetrachloride, was passed through the evaporator at a rate of 3.71 g. per minute, the evaporator temperature being such as to provide an exit gas temperature of 375° C. The hot feed vapors were mixed in the nozzle with chlorine gas admitted at a rate of 7 g. per minute to give a 29:1 molar ratio of chlorine to adiponitrile. The feed gases were charged into the reactor at a rate of 105 feet per second. The reactor temperature was kept at 640° C. during the run, and the calculated residence time was 8.5 seconds. The run was terminated after 4.38 hours, following which 76.3 g. of solid product was recovered as described in Example 1. Infrared spectra and g.l.c. retention times indicated that the product contained the following:

| | Mole percent |
|---|---|
| 3,4,5,6-tetrachloropicolinonitrile | 58.9 |
| 2,4,5,6-tetrachloronicotinonitrile | 21.1 |
| 2,3,5,6-tetrachloroisonicotinonitrile | 9.4 |
| Pentachloropyridine | 8.4 |
| Lower chlorinated products | 1.1 |

The various pentachloropyridine and 2-, 3- and 4-cyanotetrachloropyridine compounds can be separated from one another by fractional distillation and redistillation, preferably under reduced pressures and with the use of distillation columns having a large number of theoretical plates. Separation can also be effected by preparative g.l.c. techniques.

Example 3

Using the equipment and the same general procedure as described in Example 1, a feed solution containing 45 g. (0.424 mole) of 1,4-dicyano-2-butene in 225 g. of chloroform and 180 g. of carbon tetrachloride warmed to 55° C. was passed through the evaporator at a rate of 4.98 g. per minute for 80 minutes. The evaporator temperature was such as to provide an exit gas temperature of 400° C. The hot vapors were mixed in the nozzle with chlorine gas admitted at a rate of 7 g. per minute to give a 21:1 molar ratio of chlorine to dinitrile. The gases were charged into the reactor at a rate of 116 feet per second. The reaction temperature was kept at 650° C. during the run, and the calculated residence time was 8 seconds. The product recovered weighed 79 grams and was shown by infrared spectra and g.l.c. retention times to have the following composition:

| | Mole percent |
|---|---|
| 3,4,5,6-tetrachloropicolinonitrile | 62.1 |
| 2,4,5,6-tetrachloronicotinonitrile | 19.5 |
| 2,3,5,6-tetrachloroisonicotinonitrile | 9.1 |
| Pentachloropyridine | 9.4 |

Example 4

Using the equipment and the same general procedure as described in Example 1, a feed solution containing 20 g. of 1,4-dicyano-1-butene in 100 g. of chloroform and 80 g. of carbon tetrachloride was passed through the evaporator at a rate of 3.56 g. per minute for 56 minutes. The temperature in the evaporator was such as to provide an exit gas temperature of approximately 325° C. The hot vapors were mixed in the nozzle with chlorine gas admitted at a rate of 7 g. per minute to give a 25:1 molar ratio of chlorine to dinitrile. The feed gases were charged into the reactor at a rate of 102 feet per second. The reaction temperature was kept at 610° C. during the run, and the calculated residence time was 9 seconds. In working up the product, the solution remaining after driving off the excess chlorine and hydrogen chloride was taken up in methylene dichloride, filtered with charcoal and then boiled on a steam bath to constant weight. There was recovered 49.4 grams of a semisolid product which was shown by infrared spectra and g.l.c. retention times to have the following composition:

| | Mole percent |
|---|---|
| 3,4,5,6-tetrachloropicolinonitrile | 57.2 |
| 2,4,5,6-tetrachloronicotinonitrile | 20.5 |
| 2,3,5,6-tetrachloroisonicotinonitrile | 8.4 |
| Pentachloropyridine | 7.2 |
| Lower chlorinated products | 6.6 |

Example 5

Using the equipment and the same general procedure as described in Example 1, a feed solution containing 50 g. (0.943 mole) of acrylonitrile in 450 g. of carbon tetrachloride was passed through the evaporator at a rate of 4 g. per minute for 60 minutes, thereby using up approximately 50 percent of the feed solution. The temperature in the evaporator was such as to provide an exit gas temperature of 190° C. The hot vapors were mixed in the nozzle with chlorine gas admitted at a rate of 7 g. per minute to give a 13:1 molar ratio of chlorine to acrylonitrile. The feed gases were charged to the reactor at a rate of 97 feet per second. The reaction temperature was kept at 550° C. during the run, and the calculated residence time was 9 seconds. There was recovered 12 g. of a dark liquid product, using the method of Example 1, and this product was found by infrared spectra and g.l.c. retention times to contain:

| | Mole percent |
|---|---|
| 3,4,5,6-tetrachloropicolinonitrile | 21 |
| 2,4,5,6-tetrachloronicotinonitrile | 32 |
| 2,3,5,6-tetrachloroisonicotinonitrile | 21.5 |
| Lower chlorinated products | 25 |

Example 6

Using the equipment and the same general procedure as described in Example 1, a feed solution containing 20 g. (0.228 mole) of 2-chloroacrylonitrile in 180 g. of carbon tetrachloride was passed through the evaporator at a rate of 4.1 g. per minute for 35 minutes, thereby using up approximately ⅔ of the feed solution. The temperature in the evaporator was such as to provide an exit gas temperature of 275° C. The hot vapors were mixed in the nozzle with chlorine gas admitted at a rate of 7 g. per minute to give a 21:1 molar ratio of chlorine to chloroacrylonitrile. The feed gases were charged to the reactor at a rate of 102 feet per second. The reaction temperature was kept at 600° C. and the calculated residence time was 9 seconds. There was recovered 19 g. of a dark oily product, using the method of Example 1, and this product was found by infrared spectra and g.l.c. retention times to contain:

| | Mole percent |
|---|---|
| 3,4,5,6-tetrachloropicolinonitrile | 20.2 |
| 2,4,5,6-tetrachloronicotinonitrile | 19.5 |
| 2,3,5,6-tetrachloroisonicotinonitrile | 11.7 |
| Pentachloropyridine | 14.3 |
| Lower chlorinated products | 34.4 |

Example 7

Using the equipment and the same general procedure as described in Example 1, a feed solution containing 8 g. (0.072 mole) of heptanonitrile in 72 g. of carbon tetrachloride was passed through the evaporator at a rate of 3.63 g. per minute for 22 minutes. The temperature in the evaporator was such as to provide an exit gas temperature of 210° C. The hot vapors were mixed in the nozzle with chlorine gas admitted at a rate of 7 g. per minute to give a 30:1 molar ratio of chlorine to nitrile. The feed gases were charged to the reactor at a rate of 93 feet per second. The reaction temperature was kept at 550° C. and the calculated residence time was 10 seconds. There was recovered 14.5 g. of a crude product, using the method of Example 1, and the product was found by infrared spectra and g.l.c. retention times to contain 17.4 mole percent pentachloropyridine and 52 mole percent of pentachlorobenzonitrile.

Example 8

Using the equipment and the same general procedure as described in Example 1, a feed solution containing 10 g. (0.103 mole) of hexanonitrile in 90 g. carbon tetrachloride was passed through the evaporator at a rate of 3.68 g. per minute for 28 minutes. The temperature in the evaporator was such as to provide an exit gas temperature of 180° C. The hot vapors were mixed in the nozzle with chlorine gas admitted at a rate of 7 g. per minute to give a 27:1 molar ratio of chlorine to nitrile. The feed gases were charged to the reactor at a rate of 98.4 feet per second. The reaction temperature was kept at 605° C. and the calculated residence time was 9 seconds. There was recovered 18 g. of a crude product, using the method of claim 1, and the product was found by infrared spectra and g.l.c. retention times to contain 10.4 mole percent pentachloropyridine and 32.5 percent hexachlorobenzene.

Example 9

Using the equipment, and in a manner generally similar to that of Example 1, liquid valeronitrile is fed through the evaporator tube at a rate of 0.40 g. per minute in the absence of carbon tetrachloride or other inert diluent, the temperature in the tube being such as to evaporate the feed and provide a vapor exit temperature of approximately 210° C. The hot vapors are mixed in the nozzle with chlorine gas admitted at a rate of about 10 g. per minute to give a 29:1 molar ratio of chlorine to nitrile. The feed gases are charged to the reactor at a rate in excess of 100 feet per second. The reaction temperature is kept at 600° C. throughout the run, and the calculated residence time is of about 9 seconds. Using the recovery method of Example 1, there is recovered a product from which pentachloropyridine can be recovered in good yield.

The products produced by the method of the present invention have numerous useful applications. They are useful as intermediates for the preparation of other chlorinated, heterocyclic nitrogen compounds. For example, pentachloropyridine can be reacted with sodium methylmercaptide to form 2,3,5,6-tetrachloro-4-methylthiopyridine which is then oxidized to the corresponding sulfone. The latter product is useful as a paint preservative and for other fungicidal applications.

All the products produced hereby can be employed directly as pesticides. Alternatively, the products may be admixed with solid or liquid carriers and/or surface-active dispersing agents to provide compositions having pesticidal characteristics. Thus, pentachloropyridine can be used for the control of undesirable plants and weed seeds. In representative operations, aqueous compositions containing pentachloropyridine give good control of vegetation such as wild oats when applied at a dosage level of 50 pounds per acre to soil planted therewith. The several 2-, 3- and 4-cyanotetrachloropyridine isomers have good fungicidal activity and each can be employed as a broad spectrum soil fungicide. Each gives excellent control of soil dwelling fungi such as damping-off organisms when said compound is distributed in soil containing said organisms, the distribution being carried out so as to provide a concentration of 100 parts by weight of active compound per million parts by weight of soil.

The various aliphatic nitriles which can be employed as starting materials in the practice of this invention can be obtained by methods of preparation which are known to the skilled in the art. Thus, each of the mononitriles and dinitriles can be prepared from the corresponding carboxylic acids or their alkyl esters. In one such method, the ester can be reacted with ammonia to form the corresponding amides or diamides, and the latter can be reacted with phosphorus pentoxide to convert the

—C(O)NH₂ to —CN. The amidation takes place smoothly and is completed in a few minutes as the mixed reactants, in an aqueous or alcoholic solution, are heated at reflux temperatures. The relative amounts of the respective reactants are not critical, though an excess of the ammonia is desirable. The nitriles are formed as the amide is reacted with phosphorus pentoxide for several hours at temperatures of about 160° to 250° C. The reaction is usually conducted at reduced pressures, and the nitrile can either be continuously distilled off as it is formed or it can be recovered at the end of the reaction. Such compounds as acrylonitrile, propionitrile, butyronitrile, n-valeronitrile, hexanonitrile, heptanonitrile, isobutyronitrile, 4-pentenonitrile, 4-pentynonitrile, 2-butenonitrole, 2- and 3-chloroacrylonitrile, 2- and 3-chloropropionitrile, 2- and 3-dichloropropionitrile, 3- and 4-chlorobutyronitrile, 3- and 5-chloropentanonitrile, 2,3-dichlorobutyronitrile, 2,3-dichloropropenonitrile, adipronitrole, 1,4-dicyano-1-butene, 1,4-dicyano-2-butene, 2,2'-diethyladiponitrile and 2,4-hexadiene-1,6-dinitrile can be prepared by this method.

We claim:

1. The process for the production of highly chlorinated, pyridine and the isomeric cyanopyridines which comprises reacting well mixed vapors of an aliphatic nitrile and chlorine in the presence of a diluent gas at temperatures in a range of from at least 450° to 750° C., wherein said chlorine is present in excess over the stoichiometrically required amount, and wherein said aliphatic nitrile is (1) an acyclic aliphatic hydrocarbon mononitrile containing from 3 to 7 carbon atoms, inclusive, with at least 3 of said carbon atoms being in a straight chain wherein the carbon atom of the nitrile group occupies a terminal position in said chain, (2) an acyclic aliphatic hydrocarbon dinitrile containing from 6 to 10 carbon atoms, inclusive, with 5 or 6 of said carbon atoms being in a straight chain wherein the carbon atoms of the nitrile groups occupy the alpha and omega positions in said chain, or (3) a chloro derivative of any of the foregoing having not more than one chlorine atom on any one carbon atom thereof.

2. The process in accordance with claim 1 wherein the diluent gas comprises at least one highly chlorinated hydrocarbon.

3. The process in accordance with claim 1 wherein the recited acyclic aliphatic hydrocarbon mononitrile contains a total of from 5 to 7 carbon atoms, inclusive, and the reaction products variously comprise pentachloropyridine, pentachlorobenzonitrile and hexachlorobenzene.

4. The process in accordance with claim 3 wherein the aliphatic nitrile is valeronitrile, and wherein the reaction product comprises pentachloropyridine.

5. The process in accordance with claim 1 wherein the recited acyclic aliphatic hydrocarbon mononitrile contains a total of 3 or 4 carbon atoms, and the reaction product comprises pentachloropyridine and isomeric tetrachlorocyanopyridines.

6. The process in accordance with claim 5 wherein the aliphatic nitrile is acrylonitrile or a chloroacrylonitrile, and wherein the reaction product comprises pentachloropyridine and isomeric tetrachlorocyanopyridines.

7. The process in accordance with claim 1 wherein the aliphatic nitrile reactant is a recited acyclic aliphatic hydrocarbon dinitrile, and the reaction product comprises highly chlorinated pyridine and isomeric cyanopyridines.

8. The process in accordance with claim 7 wherein the aliphatic nitrile is adiponitrile, 1,4-dicyano-1-butene or 1,4-dicyano-2-butene, and wherein the reaction product comprises pentachloropyridine and isomeric tetrachlorocyanopyridines.

9. The process for the production of perchlorinated benzene, benzonitrile, pyridine and the isomeric cyanopyridines which comprises reacting well mixed vapors of chlorine and an aliphatic nitrile at temperatures in a range of from at least 450° to 750° C., said chlorine being present in at least a 3-fold excess over the stoichiometrically required amount, and said aliphatic nitrile being (1) an acyclic aliphatic hydrocarbon mononitrile containing from 3 to 7 carbon atoms, inclusive, with at least 3 of said carbon atoms being in a straight chain wherein the carbon atom of the nitrile group occupies a terminal position in said chain, (2) an acyclic aliphatic hydrocarbon dinitrile containing from 6 to 10 carbon atoms, inclusive, with 5 or 6 of said carbon atoms being in a straight chain wherein the carbon atoms of the nitrile groups occupy the alpha and omega positions in said chain, or (3) a chloro derivative of any of the foregoing having not more than one chlorine atom on any one carbon atom thereof.

References Cited

UNITED STATES PATENTS 3,420,833  1/1969  Taplin  260—290

HENRY R. JILES, Primary Examiner

H. I. MONTZ, Assistant Examiner

U.S. Cl. X.R.

260—650, 294.8, 294.9, 465, 465.2